United States Patent
Bakker et al.

[15] 3,695,415
[45] Oct. 3, 1972

[54] FEEDER FOR LIVESTOCK

[72] Inventors: Donavon L. Bakker; Walter L. Miller, both of Fort Atkinson, Wis.

[73] Assignee: Butler Manufacturing Company, Kansas City, Mo.

[22] Filed: July 28, 1970

[21] Appl. No.: 58,783

[52] U.S. Cl. .................. 198/110, 119/52 B, 198/126
[51] Int. Cl. ...... A01k 5/02, B65g 21/12, B65g 41/02
[58] Field of Search.................. 198/126, 59, 66–67, 198/110, 218; 119/52 R, 56, 52 B; 214/17.6

[56] References Cited

UNITED STATES PATENTS

| | | | |
|---|---|---|---|
| 769,947 | 9/1904 | Kramer.......................198/110 |
| 3,428,027 | 2/1969 | Haen........................198/67 X |
| 2,038,471 | 4/1936 | Benatar.....................198/204 |
| 1,422,002 | 7/1922 | Shaw.........................198/204 |
| 1,521,820 | 1/1925 | Lloyd.....................198/218 X |
| 2,649,978 | 8/1953 | Smith..........................214/26 |
| 2,873,037 | 2/1959 | Fischer.....................214/17.6 |

*Primary Examiner*—Edward A. Sroka
*Attorney*—Scofield, Kokjer, Scofield & Lowe

[57] ABSTRACT

A feeder apparatus having an elongate, hooded supporting structure positioned above a feed trough. A reciprocally movable carriage of approximately one-half the length of the supporting structure is mounted thereon. A flexible conveyor belt is trained around belt guides on the carriage and the belt forms a loop about the carriage. The belt receives feed from a hopper and the feed is distributed along the trough in response to reciprocation of the carriage along the supporting structure and the accompanying shifting of the loop. In one form of the invention, the belt has permanently anchored portions. In another r form, an anchoring mechanism selectively grips portions of the conveyor belt to hold same stationary during certain phases of reciprocation of the carriage.

4 Claims, 14 Drawing Figures

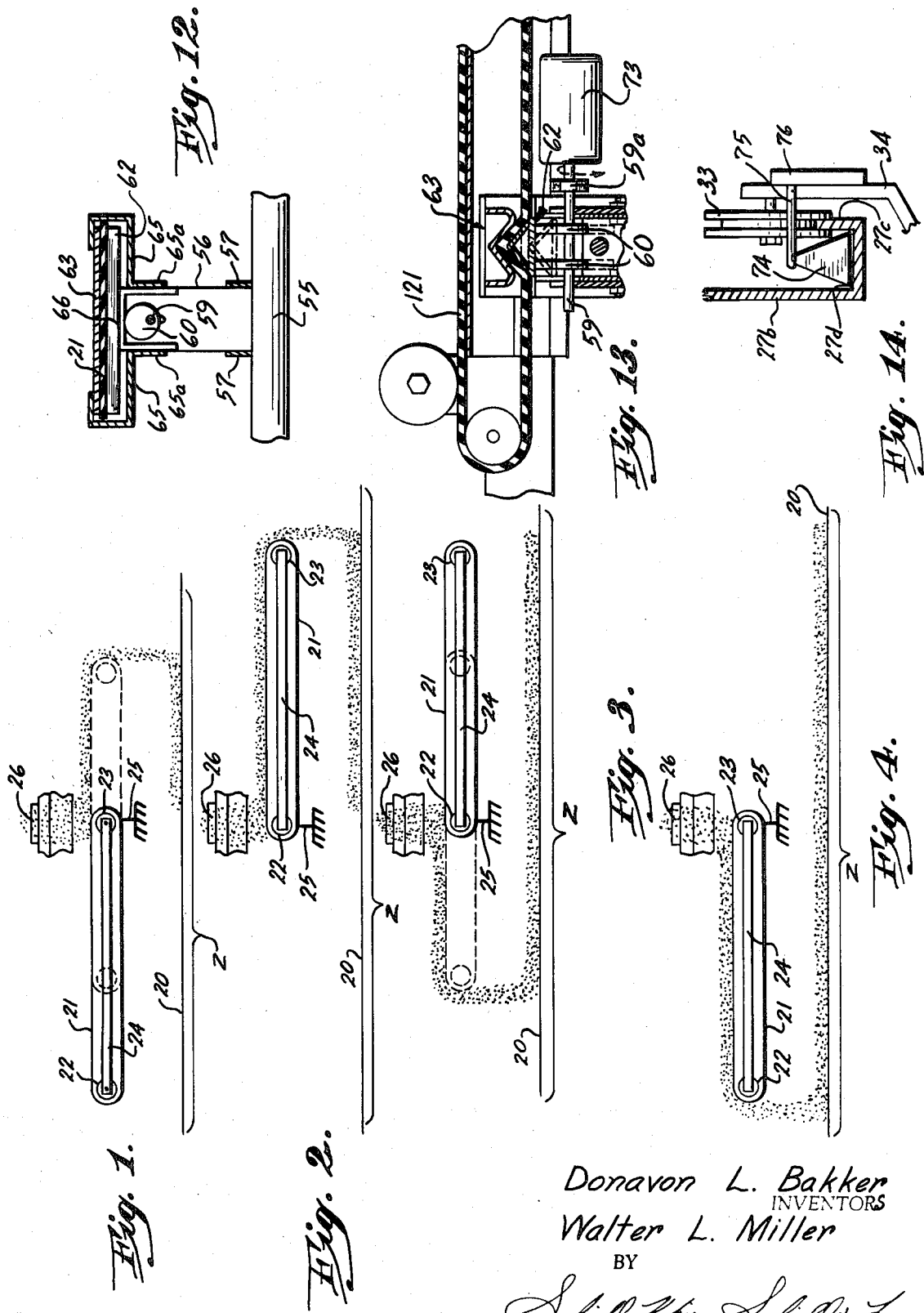

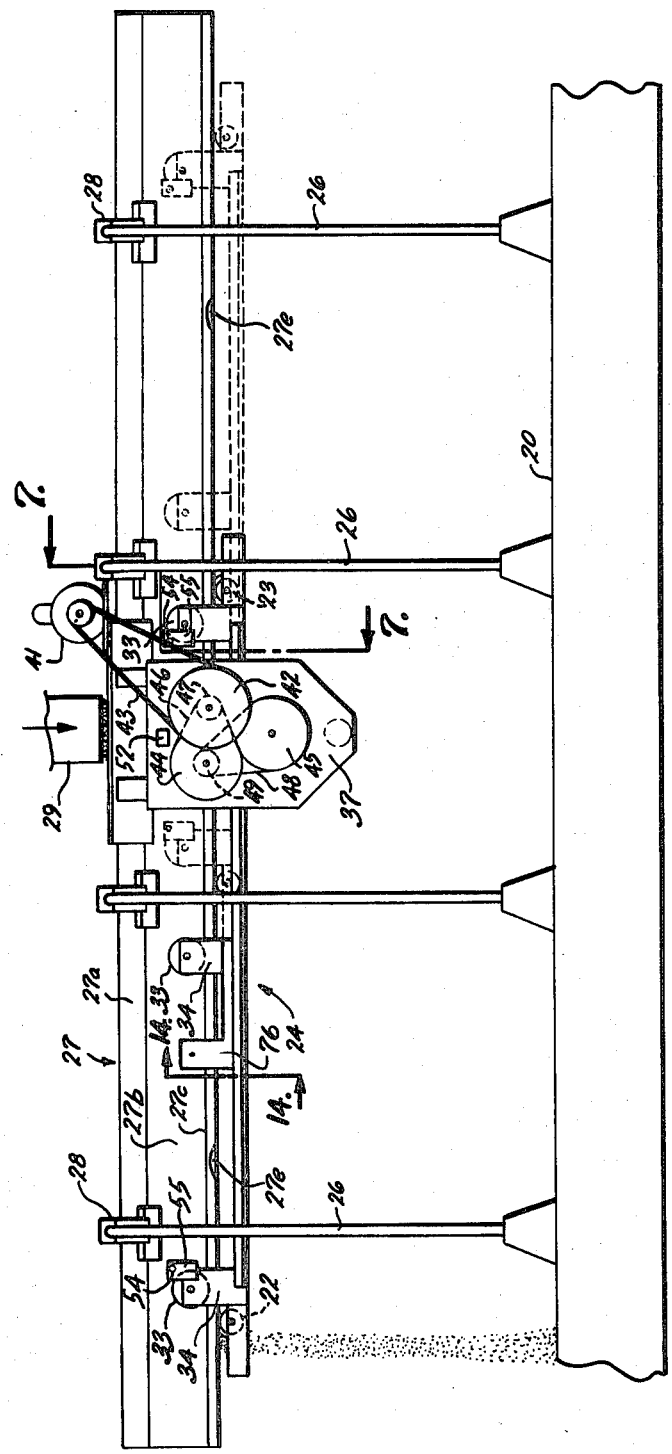
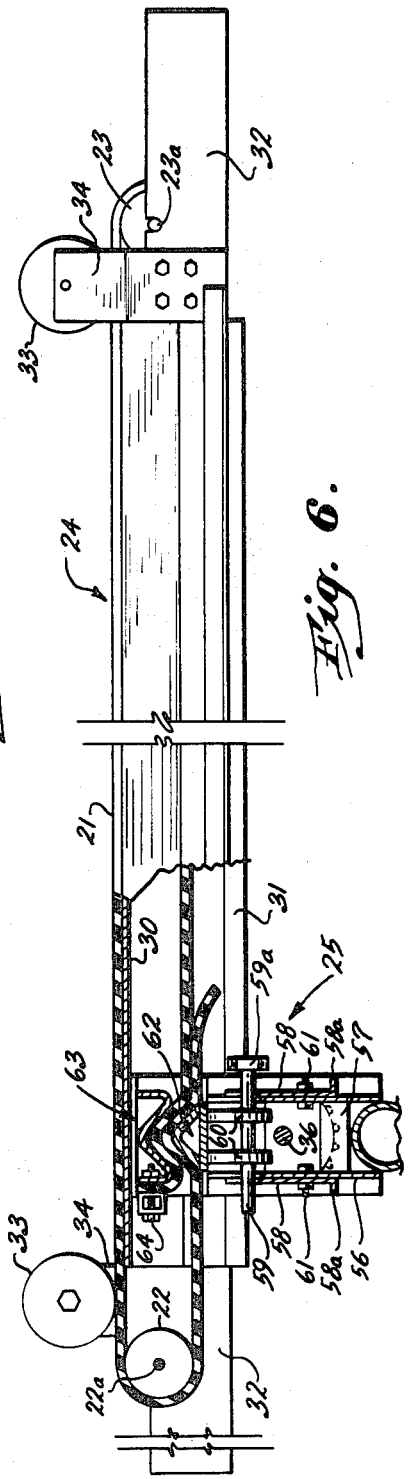

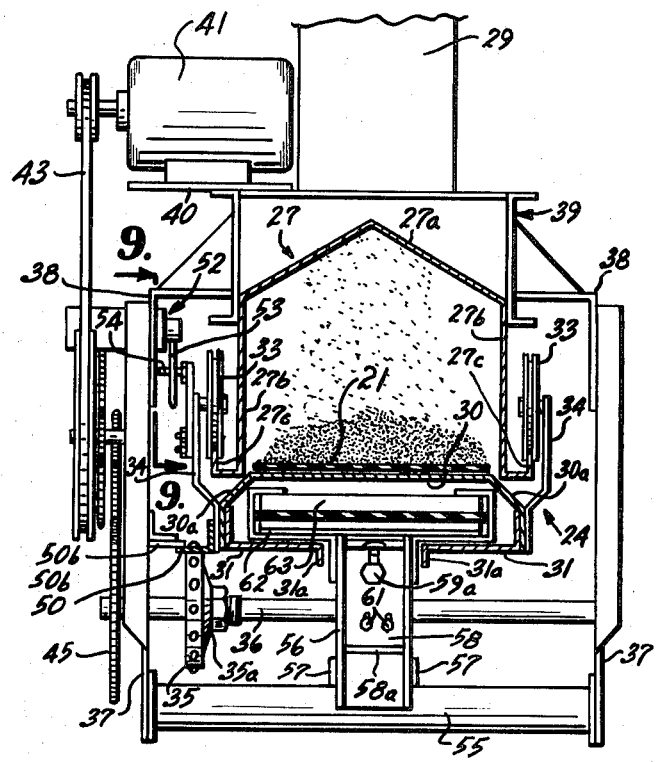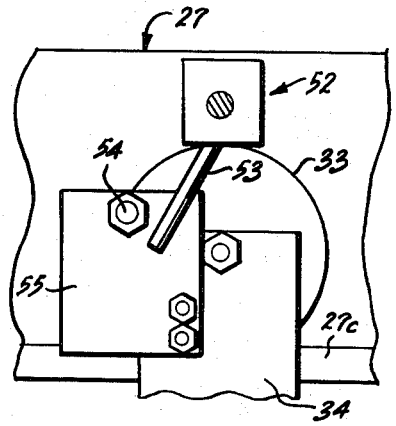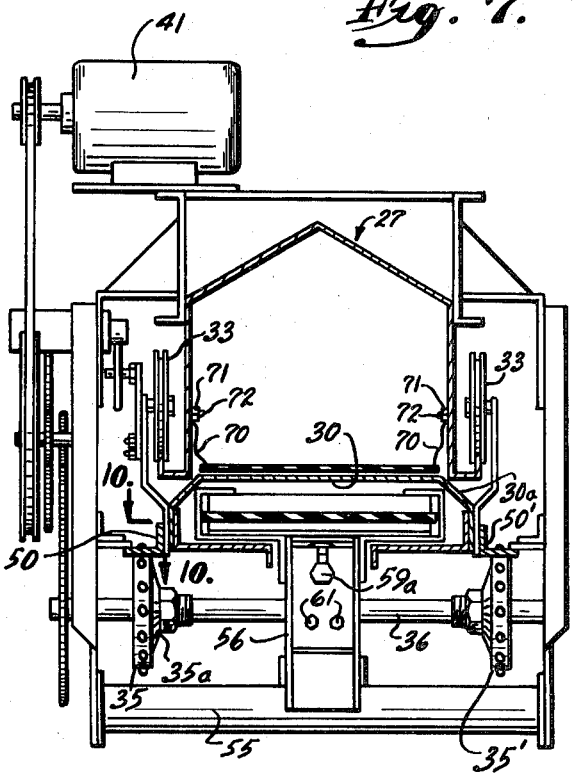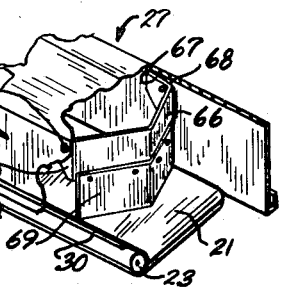

3,695,415

FEEDER FOR LIVESTOCK

BACKGROUND AND SUMMARY OF THE INVENTION

This invention relates to livestock feeding and refers more particularly to what is commonly called bunk feeding.

A common practice in the feeding of cattle is to deliver the feed to rather long troughs known as feed bunks. Not too distantly in the past, the delivery was most often done by hand or by feed trucks, which would move along the bunks and progressively drop feed into the bunk to the desired quantity per unit of length. More recently various types of stationary feed handlers associated with the bunks have made their appearance. These include troughs or tubes positioned above the bunk and into which feed is delivered, spread and dumped as required; belt, chain or screw conveyors which impel the feed from a central supply along the bunk and progressively deposit it at what is intended to be a uniform rate per unit of length; and travelling feed platforms or belts which pick up the feed from a central supply and move it along the bunk, the feed being progressively swept from the platform or bunk as the carriage moves, by means of stationary intercepter baffles.

Major difficulties have been encountered in achieving operational efficiency and low maintenance of the equipment known to the art. In the auger type units, feed separation often occurs, the finer particles being discharged near the input end with the larger particles carried on to more distant discharge points. Furthermore, rough, uneven feeds are difficult to handle in such devices and there is a tendency to jam and clog under adverse weather conditions. In the platform conveyors, and also the moving belt and drag chain devices, the drive motors are generally mounted for movement along the trough which necessitates heavy duty bearings, strong supports for the equipment, and lengthy power cords. Also in present belt type equipment there are problems with belt stretch and short belt life.

One of the principal objects of the present invention is to provide a bunk feeder in which the problems associated with presently known equipment are eliminated or reduced to the point of insignificance. Further objects of our invention are to provide for the reduction of operating noise in structures of this type, the protection of the feed during handling from inclement weather, the reduction of power required for comparable feed volumes and currently available equipment, and of accomplishing all the above claimed objectives while providing greater safety to the operator and over a longer useful life.

The feeder construction according to our invention comprises in general a flexible belt which has associated with it a belt operating mechanism by which feed from a central supply is deposited on the belt is delivered in a progressive fashion along the feed bunk. The belt defines a loop with the ends of the loop held fixed during discharge of feed from the belt. A travelling belt support carriage is fitted within the loop and operates upon movement along the bunk to change the configuration of the loop with respect to the fixed ends so that the upper surface or flight of the loop above the carriage moves across the carriage in the direction of advance of the carriage at twice the rate of movement of the carriage itself. Feed is introduced onto the upper surface of the belt at a selected point along the path of movement of the carriage and as the belt loop configuration is changed, is dropped off one or the other end of the loop depending upon the direction of carriage movement.

We have provided two embodiments of our invention, the first of which is designed to distribute feed along the bunk in a symmetrical distribution on opposite sides of the midpoint of a selected feed zone. In this embodiment, the feed is introduced onto the belt at the feed zone midpoint. The other embodiment provides a means for selectively feeding at limited areas within the overall feed zone and structurally differs from the first embodiment in the fact that the belt loop is composed of an endless belt wherein a section of the belt is alternately gripped and released so that the belt, rather than having permanently fixed ends as in the first embodiment, advances stepwise around and along the carriage in response to the reciprocation of the latter. In the second embodiment, the feed is delivered off one end only of the carriage supported loop in a series of repeated overlapping discharges.

Other and further objects of the invention together with the features of novelty appurtenant thereto will appear in the course of the following description.

DESCRIPTION OF THE DRAWINGS

In the accompanying drawings, which form a part of the specification and are to be read in conjunction therewith, and in which like reference numerals indicate like parts in the various views:

FIGS. 1 through 4 are diagrammatic representations indicating the general nature of operation of one embodiment of the invention;

FIG. 5 is a side elevational view of a typical feed bunk constructed in accordance with said one embodiment of the invention;

FIG. 6 is a greatly enlarged side elevational view of the travelling carriage, showing also in section a portion of the belt and the belt clamping mechanism;

FIG. 7 is a sectional view on an enlarged scale taken along line 7—7 of FIG. 5 in the direction of the arrows;

FIG. 8 is a view similar to FIG. 7 but showing a somewhat modified form of drive and illustrating also the side seals for the belt;

FIG. 9 is an enlarged fragmentary cross section taken generally along line 9—9 of FIG. 7 in the direction of the arrows;

FIG. 10 is an enlarged fragmentary cross section taken along line 10—10 of FIG. 8 looking in the direction of the arrows;

FIG. 11 is a fragmentary end perspective view of one end of the feeder illustrating the belt cleaning baffle structure adjacent the ends thereof;

FIG. 12 is a sectional view in a somewhat reduced scale taken along line 12—12 of FIG. 6 in the direction of the arrows;

FIG. 13 is a fragmentary view similar to FIG. 6 but illustrating a modified form of belt and belt clamping mechanism; and FIG. 14 is an enlarged, partly sectional, view along line 14—14 of FIG. 5 in the direction of the arrows.

It is believed that a better and quicker understanding of the details of construction had by comprehending first the general principals of operation of the first embodiment of the invention. To this end attention is directed initially to FIGS. 1 through 4, which illustrate diagrammatically the positions of certain key components during successive steps in the feed cycle.

The invention will be described in connection with the conventional feed bunk, which is nothing more than an elongate trough into which feed is dumped. The feed receiving surface of the trough is indicated by line 20. Located above the feed receiving surface is a flexible belt 21 which is trained around roller guides 22 and 23. The roller guides are carried by and are part of a travelling carriage represented as 24. As subsequently will be seen, the carriage is supported for horizontal reciprocal movement by a trolley and drive system not shown in FIGS. 1–4; it suffices to know at this point that the carriage has an overall length between guides approximately one-half the length over which feed is to be distributed on the feed receiving surface.

For purpose of convenience the length over which feed is to be distributed will hereinafter be called the feed zone and is identified by letter Z. The carriage is reciprocated between end limit positions in which alternately roller guides 22 or 23 are adjacent the midpoint of the feed zone (FIGS. 1 and 4 show the left limit position and FIGS. 2 and 3 show the right limit position).

The belt 21 forms in effect a loop around the carriage. The loop includes an upper belt surface bridging between the guides 22, 23. The belt has portions anchored against movement, the anchoring point being indicated at 25. The anchoring point is located substantially at the midpoint of the feed zone Z. Thus, as the carriage is traversed back and forth, the belt must, as the carriage moves to the right, travel in the clockwise direction with respect to the carriage, and as the carriage is moving back from right to left, the belt will move in the counterclockwise direction relative to the carriage.

Feed is delivered onto the upper surface of the belt from any suitable central supply. Preferably it is delivered in a substantially continuous gravity stream 26 located directly above the belt and carriage and substantially at the midpoint of the feed zone.

The starting condition for the system is assumed to be that shown in solid lines in FIG. 1. Carriage 24 is at its left-hand limit position and its initial movement will be to the right. As the carriage advances, the belt loop 21 is advanced also, but since the belt is fixed at point 25, not only will the belt move with the carriage but it will be advanced clockwise relative to the carriage, thus creating a surface which moves along the top of the carriage at approximately twice the speed of the carriage itself. As feed is delivered onto the top surface, it is carried to the right and is dumped over the right-hand end. Of course, the continuous stream of the feed 26 results in covering the entire top surface of the carriage when it has arrived at the full right position as illustrated in FIG. 2.

At this point, the direction of movement is reversed. With the carriage moving to the left, the belt is advanced counterclockwise around the carriage with the top surface moving to the left at approximately twice the velocity of the carriage. Accordingly, the layer of feed deposited on the belt during its travel to the right will now be discharged off the left-hand end of the carriage along with the feed picked up during leftward movement. The top surface of the belt is kept filled by the continuing stream of feed. When the carriage reaches the end of limit position of FIG. 4, the belt is fully loaded and the unit is ready for a repeat cycle. The cycle is repeated until the desired amount of feed has been deposited.

Referring now to FIGS. 5 through 12, which illustrate in more detail a specific embodiment of the invention, and commencing initially with reference to FIG. 5, the feed bunk is shown at 20. Spaced along the feed bunk are uprights 26 which serve to support an elongate combined hood and trolley support represented generally by reference numeral 27. The connection of the post 26 with the elongate hood 27 can be by any suitable means, as by the brackets 28. Alternatively the hood 27 can be suspended from overhead supports where they are available.

The cross-sectional shape of the hood is shown in FIG. 7. In essence, it is a generally inverted U-shape, with a peaked top wall 27a and the spaced vertical side walls 27b. At the lower end of each side wall is an outturned flange which terminates in an upturned leg 27c which, as will be seen, provides tracks on the opposite sides of the hood on which the trolley wheels for the travelling carriage run.

The top wall 27a of the combined hood and support is provided at the midpoint along its length with an opening (not shown) through which feed can be fed from the feed supply pipe 29.

The main body of the carriage comprises an inverted channel-like structure 30 having the downturned side edges 30a. Secured to the vertical portion of each side edge 30a either by welding or bolting is a Z-shaped member 31 which extends inwardly. The inward ends 31a of Z members 31 are spaced from one another to provide an elongate slot running the full length of and below the pan 30.

Secured to the opposite ends of the carriage pan 30 are parallel end extensions 32 as shown in FIG. 6. The extensions 32 are provided with recesses on the upper edge to receive stub axles 22a, 23a extending from opposite ends of the guide rollers 22, 23 to which reference earlier has been made.

Trained around the guide rollers 22, 23 is the flexible belt 21. Alternatively, a flexible chain conveyor may be used. The belt rides on the upper surface of the carriage pan 30. As earlier explained, the belt is anchored by an anchoring mechanism 25 which will subsequently be explained in detail. The belt may be constructed from any suitable material. We prefer a two-ply woven nylon fabric belt to which is bonded a rubber coating to provide resistance to mildew. Such a belt is tough and resilient and has excellent cold weather flexing capabilities. It is made sufficiently wide as to insure that the belt edges are located as close to the side walls 27b of the hood as they can be without interfering with the side walls during travel of the carriage.

The carriage is supported for horizontal travel along the hood and support 27 by means of trolley wheels 33 located on opposite sides thereof. The trolley wheels ride on the tracks 27c. Each trolley wheel has supported therefrom a suspension arm 34 which is connected with the pan 30 either by welding or bolting. There are a plurality of trolley wheels 33 on each side of the carriage, the number depending upon the length of the carriage.

In the embodiment of the invention illustrated in FIGS. 5, 6 and 7, the drive mechanism for propelling the carriage back and forth along the hood 27 comprises a toothed drive sprocket 35 which is driven by a shaft 36. A torque limiting clutch 35a in the form of a friction clutch is interposed between the shaft and sprocket. The shaft 36 extends between and is supported by appropriate bearings (not shown) mounted on the side plates 37 located on opposite sides of the hood. The side plates are supported from the hood by brackets 38 which are connected with a superstructure 39 lying on top of and connected with the hood structure. Superstructure 39 includes the motor mount plate 40.

Mounted on motor plate 40 is a reversible electric motor 41. The motor 41 is drivingly connected through a speed reduction assembly to the shaft 36. The speed reduction assembly includes the belt driven pulley 42 to which motor 41 is connected by belt 43, a chain driven sprocket 44 and finally another chain driven sprocket 45 which is secured to the shaft 36. Sprocket 44 is driven by a chain 46 which is trained around a small sprocket 47 on the shaft of pulley 42. Sprocket 45 is driven by chain 48 which is trained about the small sprocket 49 which is on the shaft of sprocket 44.

The toothed sprocket 35 forms part of what is substantially a rack and pinion arrangement. The rack comprises the horizontal leg of an angle iron 50 which is secured to the carriage and runs substantially the full length thereof. As shown in FIG. 10, the horizontal leg of angle iron 50 is provided with a series of perforations 50a which are so spaced as to receive the teeth on sprocket 35.

In order to insure a firm inter-engagement between the teeth on sprocket 35 and the holes in the rack 50, we have provided a sliding hold down for the rack in the form of a low friction hold down bar 50b which is secured to a support angle 50c connected to the inside wall of the support plate 37. The hold down bar 50b partially overlaps the horizontal leg of the rack member 50 and has sliding contact therewith. Preferably the hold down 50b is in the form of a short nylon bar which is bolted to its support angle.

The motor 41 is controlled by an over-center type snap acting reversing switch 52 (see FIGS. 7 and 9) having the activating lever arm 53. The switch 52 is located substantially at the midpoint of the unit. The arm 53 depends below the switch structure and lies in the path of a pair of trip arms 54 carried on brackets 55 which are secured to the end most trolley suspension arms on the motor side of the unit. Preferably the arms 54 are formed as lengths of coil spring with sufficient strength to activate the switch arm 53 but still capable of passing switch arm on overrun. Switch 52 is a conventional reversing switch placed in the circuit of the reversible motor in the manner known to the art. The switch arms 54 are so located as to effect change in condition of switch 52, and thus reversal of the direction of carriage movement, as the ends of the carriage approach in close proximity to the midpoint of the feed unit.

Turning now to a more detailed description of the belt anchoring mechanism and referring more particularly to FIGS. 6, 7 and 12, extending between and firmly secured to the respective side plates 37 near the bottom thereof is a tube 55. The tube 55 provides support for a pair of spaced upright channel-like members 56 which are connected together just above the tube by the cross straps 57 welded thereto. Each channel has imposed on its outer face an adjusting plate 58 having the bottom flange 58a. Plates 58 (and channels 56) are notched out at the upper ends to provide for passage of and bearing support for a shaft 59 carrying a pair of eccentric cams 60. Shaft 59 rests in the bases of the notches in the plates 58, which can be adjusted in height relative to channels 56 by means of bolts and nuts 61. The shaft 59 carries at its outer end a hex head 59a by means of which the shaft can be rotated.

The cams 60 are intended to operate against the base of a vertically movable clamping member 62 which is of generally triangular cross section and which interacts with a V-groove in the top clamping member 63. One end of the belt 21 is attached to the side of the upper clamping member 63, as by the bolt and clamp 64. The belt passes through the space between the clamping members 62 and 63 and the unanchored end is also drawn through that space so that when the clamping members are tightened against one another, the belt is firmly gripped.

The lower clamping member 62 is supported for vertical movement relative to channels 56, while the upper clamping member 63 is fixed with respect to the channels. The upper clamping member is connected to the channels by the brackets 65 which, like straps 57, extend between the channel members 56 and are welded or otherwise firmly secured thereto. The lower clamping member 62 has secured to its underside a U-shaped member 66 having depending legs which slidably fit between the vertical portions 65a of bracket 65.

Because of the presence of the belt anchoring mechanism 25, the guide rollers 22, 23 of the carriage are unable to move to the exact midpoint of the feeder. Consequently, unless provision were otherwise made, there would be a small amount of feed remaining on the belt at the end of each stroke during the cycle. To remove this feed, there can be included a belt sweep arrangement like that illustrated in FIG. 11. This can be attached within the support hood 27 a short distance from one or both ends of the hood. The belt sweep is in the form of a generally V-shaped member 66 having parallel ears 67 which are pivotally supported on bolts 68. Attached to the lower edge of member 66 is a relatively stiff but still resilient flap 69 which rides closely adjacent or on the surface of the belt.

The belt sweep hangs vertically from the pin 68 and is free to pivot toward the end of the hood but is restrained by engagement of ears 67 with the corners of the hood against pivoting in the opposite direction. When the roller 23 on the carriage reaches the sweep, the feed pushes the sweep out and up, thereby letting the feed pass underneath. When the carriage and belt reverse direction, friction between the feed and sweep causes the sweep to return to its vertical position. The feed between the sweep and the roller is prevented from moving with the belt and is dropped into the bunk when the roller passes under the sweep.

In the embodiment illustrated in FIG. 7, the belt width should be made as close to the distance between the side walls 27b as can be done without developing interference during operation. Normally the gap left will be small enough as to prevent leakage of conventional feeds. However, in situations where fine feeds may be fed and where it is desired to prevent any leakage, the form of construction shown in FIG. 8 can be adopted. This comprises the inclusion along the length of the hood of flexible gasketing 70 secured to the inside of the hood by a retaining strip 71 bolted thereto as at 72. The lower edges of the gaskets are free and ride on the surface of the belt. Such an arrangement will prevent the spillage of fine particles from off the side edges of the belt.

FIG. 8 shows a further modification that can be adopted, and that is the inclusion of additional sprocket 35' and track 50' on the other side of the unit. Such a drive arrangement may be desired where the feeder is of great length or where exceptionally heavy feeds are to be handled.

FIG. 13 illustrates a modified clamp and belt arrangement which can be employed in the event it is desired to feed a different ration of feed to various groups of livestock along the length of the feed zone. For example, with reference to FIGS. 1 through 4, assume that it is desired to feed a specific ration only over the length of the feed zone embraced within the left-hand one-half thereof. In order to accomplish this, it is necessary that no feeding be done on the right-hand half of the zone. To accomplish this we provide the arrangement shown in FIG. 13. The only difference between this arrangement and what has been described in connection with the first embodiment is that the belt 121, rather than having unconnected ends, has the ends connected to form an endless belt, and that the cam shaft 59 is powered by a reversible electric motor 73. The motor 73 is connected into the circuit controlled by the reversing switch 52 and is operated as switch 52 is tripped by the fingers 54.

In the first embodiment of the invention, and again with reference to FIG. 1, as the carriage moved to the right feed was discharged onto the right-hand side of the zone. In order to eliminate this from occurring, the belt is released during the right-hand movement. This means that reversing motor 73 is rotated to the release position for cams 60, permitting the lower clamping member 62 to drop to a non-gripping position for the belt. Thus, as the carriage moves to the right, the belt will move with the carriage and will not move relative thereto. Feed will consequently be deposited on the upper surface of the belt as the carriage moves to the right but will not be discharged from the right-hand side of the carriage.

When the carriage reaches the right limit position, the reversing switch will be tripped, which has the effect of reversing the movement of the carriage and also of reversing motor 73 to cause the cams to drive the lower gripping member 62 upwardly into gripping relation with the belt 121. The belt is now clamped and as the carriage moves to the left, the belt will be driven in a counterclockwise direction around the carriage thus causing feed to discharge off the left-hand end. When the carriage reaches the full limit position to the left, the reversing switch 52 is again tripped causing the drive motor 41 to drive the carriage in the opposite direction and at the same time reversing motor 73 to release the belt.

It will be evident that by mounting appropriate limit switches at various points along the feed zone, and connecting them with motor 73 controlled discharge at over various portions can be obtained. Moreover, the length of the stroke of the feeder carriage can be altered also by shifting the reversing trip arms 54 to different locations along the carriage.

As noted with reference to FIGS. 7 and 14, on each side of the hood, the side wall 27b and track 27c, on which rides the trolley wheels 33, defines a channel 27d therebetween that occasionally collects feed during operation. In order to clean the trough or channel 27d, we provide openings 27e therein and a flexible finger 74 which is carried by an extension member 75 in turn supported by a bracket 76 attached to the suspension arm 34. As the carriage reciprocates along the support structure, the finger 74 sweeps out any feed accumulated in the trough 27d through one of the openings 27e.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In a feeder for depositing feed in an elongate substantially linear feed receiver having a selected feed zone of a predetermined length, the combination of
   an elongate support structure positioned above and substantially aligned with said receiver,
   a carriage supported from said support structure for substantially horizontal reciprocal linear movement parallel to and above the feed zone of said receiver, said carriage including a pair of belt guides oriented transversely with respect to the longitudinal axis of the support structure and spaced from one another in the direction of said axis approximately one-half the length of said feed zone,
   a flexible conveyor belt providing a top feed receiving surface for said carriage bridging between said guides, said belt further having portions passing on around the respective guides and back toward one another beneath the feed receiving surface,
   stationary anchoring means holding a segment of each of said portions against movement lengthwise of the receiver,
   drive means drivingly connected with said carriage for reciprocating said carriage to cause alternate movement of said guides toward and away from said anchoring means thereby to move the unanchored part of said belt alternately toward the opposite ends of the receiver and shift said feed receiving surface lengthwise relative to said carriage, and means for delivering a stream of feed onto said feed receiving surface whereby it is carried by said receiving surface toward the ends of the zone upon reciprocation of the carriage, said support structure including a stationary elongate hood overlying said receiver above said carriage, said hood including side walls extending downwardly alongside and cooperating with said belt conveyor to inhibit passage of feed off the side edges of the conveyor belt.

2. The combination as in claim 1, said side walls including a pair of upturned rails near the opposite sides of said carriage, said carriage having trolley wheels riding on said rails.

3. In a feeder for depositing feed in an elongate substantially linear feed receiver having a selected feed zone of a predetermined length, the combination of an elongate support structure positioned above and substantially aligned with said receiver, a carriage supported from said support structure for substantially horizontal reciprocal linear movement parallel to and above the feed zone of said receiver, said carriage including a pair of belt guides oriented transversely with respect to the longitudinal axis of the support structure and spaced from one another in the direction of said axis approximately one-half the length of said feed zone, a flexible conveyor belt providing a top feed receiving surface for said carriage bridging between said guides, said belt further having portions passing on around the respective guides and back toward one another beneath the feed receiving surface, stationary anchoring means holding a segment of each of said portions against movement lengthwise of the receiver, drive means drivingly connected with said carriage for reciprocating said carriage to cause alternate movement of said guides toward and away from said anchoring means thereby to move the unanchored part of said belt alternately toward the opposite ends of the receiver and shift said feed receiving surface lengthwise relative to said carriage, and means for delivering a stream of feed onto said feed receiving surface whereby it is carried by said receiving surface toward the ends of the zone upon reciprocation of the carriage, and sweep means positioned adjacent the path of said upper surface of said conveyor and operable to permit feed to move past said sweep means but to intercept and prevent further movement of the feed in the reverse direction as said carriage moves toward the other end of the receiver.

4. In a feeder for depositing feed in an elongate substantially linear feed receiver having a selected feed zone of a predetermined length, the combination of an elongate support structure positioned above and substantially aligned with said receiver, a carriage supported from said support structure for substantially horizontal reciprocal linear movement parallel to and above the feed zone of said receiver, said carriage including a pair of belt guides oriented transversely with respect to the longitudinal axis of the support structure and spaced from one another in the direction of said axis approximately one-half the length of said feed zone, a flexible conveyor belt providing a top feed receiving surface for said carriage bridging between said guides, said belt further having portions passing on around the respective guides and back toward one another beneath the feed receiving surface, stationary anchoring means holding a segment of each of said portions against movement lengthwise of the receiver, drive means drivingly connected with said carriage for reciprocating said carriage to cause alternate movement of said guides toward and away from said anchoring means thereby to move the unanchored part of said belt alternately toward the opposite ends of the receiver and shift said feed receiving surface lengthwise relative to said carriage, means for delivering a stream of feed onto said feed receiving surface whereby it is carried by said receiving surface toward the ends of the zone upon reciprocation of the carriage, said conveyor belt comprising an endless belt trained around said guides with an upper flight above the carriage and a lower flight below the carriage, said anchoring means including belt gripping members having a belt gripping condition and a belt release position, and means for alternating said belt gripping members from one condition to the other.

* * * * *